United States Patent [19]
Nippe et al.

[11] 3,819,413
[45] June 25, 1974

[54] RECHARGEABLE METAL ELECTRODE FOR STORAGE BATTERIES AND METAL-AIR CELLS

[75] Inventors: Waldemar Nippe; Dieter Gröppel, both of Erlangen, Germany

[73] Assignee: Siemens Aktiengesellschaft, Munich, Germany

[22] Filed: Dec. 11, 1972

[21] Appl. No.: 313,923

[30] Foreign Application Priority Data
Dec. 23, 1971 Germany............................ 2164208

[52] U.S. Cl........................ 136/25, 136/74, 136/75
[51] Int. Cl. .......................................... H01m 43/04
[58] Field of Search ............ 136/74, 75, 25, 20, 24, 136/28, 29, 22, 120, 120 FC, 86 D, 36

[56] References Cited
UNITED STATES PATENTS
| | | | |
|---|---|---|---|
| 1,156,315 | 10/1915 | Rowley | 136/74 |
| 2,234,732 | 3/1941 | Haunz | 136/74 X |
| 2,871,281 | 1/1959 | Moulton et al. | 136/25 |
| 3,262,815 | 7/1966 | Langer et al | 136/36 |
| 3,266,936 | 8/1966 | Krebs | 136/53 |
| 3,563,801 | 2/1971 | Cox | 136/36 |
| 3,679,482 | 7/1972 | Hardman | 136/25 |

FOREIGN PATENTS OR APPLICATIONS
1,063,233  8/1959  Germany ............................ 136/25

*Primary Examiner*—Anthony Skapars
*Attorney, Agent, or Firm*—Kenyon & Kenyon Reilly Carr & Chapin

[57] ABSTRACT

A rechargeable metal electrode for storage batteries and metal-air cells comprising active electrode material and a framework of substantially parallel fibers of electrically conductive material substantially perpendicular to the electrode surface as a carrier for the active electrode material, such that there exist alternating areas of coarse and fine pores, the coarse-pored areas consisting essentially of the framework and the fine-pored areas consisting essentially of the framework and the active electrode material.

15 Claims, 8 Drawing Figures

PATENTED JUN 25 1974 3,819,413

RECHARGEABLE METAL ELECTRODE FOR STORAGE BATTERIES AND METAL-AIR CELLS

BACKGROUND OF THE INVENTION

Motor vehicles with internal-combustion engines contribute substantially to air pollution. One solution to the problem of avoiding harmful and poisonous exhaust gases is electric propulsion with an electrochemical current source. However, electrochemical current sources which are to be used in the field of electric propulsion are subjected to stringent requirements of energy and power density.

For instance, sodium-sulfur batteries have been mentioned as high-performance batteries for electric vehicles. However, such batteries have the disadvantage that their operating temperature is about 300° C, which results in considerable technological problems. Even higher operating temperatures are required for batteries such as lithium-chlorine batteries. Other known batteries, such as silver-zinc or silver-cadmium batteries, have the additional drawbacks that they require expensive electrode materials or materials of limited availability.

Batteries comprising a plurality of metal-air cells, which do not exhibit the above-mentioned disadvantages, should be able to compete with the above-mentioned batteries by meeting the stringent energy and power density requirements. However, to do so in a feasible manner both the metal electrodes on the one hand and the air or oxygen electrodes on the other hand must be improved with regard to weight and load capacity. In the case of the air and oxygen electrodes this has already been achieved to a great extent in conjunction with investigations in the field of fuel cells.

However, difficulties were encountered with the metal electrodes. Metal-air cells with metal electrodes of an oxidizable metal, such as magnesium, zinc, cadmium, aluminum, cobalt or iron, have been known for some time. However, they are used mostly as primary cells, particularly with metals such as magnesium, zinc and aluminum. However, in order to use metal-air cells in the field of electric propulsion, it is necessary to have rechargeable metal electrodes.

Thus, the problem has arisen to find a negative metal electrode for metal-air cells and storage batteries which meets the above-mentioned requirements of high performance, high load capacity and rechargeability.

The efficiency of a storage battery, i.e., the effective utilization of its active electrode material, depends directly on the surface contact of the active electrode material with the electrolyte. One will therefore strive to use an electrode material that has a large surface area. In order to assure sufficient stability of the electrodes, the active electrode material can be placed in a conductive framework which serves as a carrier. Electrode material dispersed in such a carrier for an alkaline storage battery is described in German printed Application No. 1,063,233 where the carrier of the active material consists of sintered-together metal filaments, fibers, wires or chips or of metallized fibers of organic or inorganic materials, where the fibers extend essentially perpendicularly to the surface of the electrode plate. The tips of the fibers are welded to porous armor coatings applied to both outside surfaces of the electrode plate. In the described highly porous sintered electrodes, the inner fibers, which extend essentially perpendicularly to the plane of the electrode plate, are preferably bent and upset. The active material which is compacted and enclosed between these fibers is placed in the electrodes by impregnation. The highly porous electrodes are impregnated by immersion in the appropriate metal salts or solutions, with subsequent immersion in hot potassium or sodium hydroxide. The immersion and the subsequent precipitation of the metal hydroxides or oxide hydrates are carried out in such a manner that all voids in the sintered framework of the electrodes are completely filled with active material.

However, even the performance of such electrodes is not yet satisfactory in part because it is desirable to have available electrodes of the highest possible capacity. This does not occur in the above described electrode because during the discharge of a metal-air cell, oxidation products, such as metal oxides and/or metal hydroxides formed at the negative electrode in the course of the electrochemical reaction, tend to clogg up existing pores from the electrolyte side due to swelling. This leads to the discharge being impeded or even terminated prematurely, as the access of electrolytic liquid to the active electrode material that is further removed from the phase boundary between the electrode and the electrolyte, is completely or almost completely stopped. In addition, the mechanical strength of the electrodes can be impaired by the swelling processes described.

It is therefore a particular object of this invention to find a rechargeable metal electrode for storage batteries and metal-air cells with a framework of essentially parallel fibers of electrically conductive material, which are arranged essentially perpendicularly to the surface of the electrode, as the carrier for the active material, and a porous armor coating closing off the framework, which is free of the disadvantages mentioned. Compared with conventional electrodes, the electrode is to have increased capacity, higher power and energy density as well as improved mechanical stability.

DESCRIPTION OF THE INVENTION

According to the invention, this is achieved by providing an electrode which contains as the active material metal powder, preferably iron powder, to which carbon and a binder are added; a framework made up of fibers and arranged on at least one side of a contact layer such that the framework contains the active material together with the additives and has alternating areas with coarse and fine pores, which extend perpendicularly to the contact layer, the areas with coarse pores consisting essentially of the fiber lattice and the areas with fine pores essentially of fiber lattice with the embedded active material and the additives.

Besides iron, which is used preferentially, other metals, particularly cadmium and cobalt can be applied as the active material in the electrode.

The rechargeable metal electrode according to the invention has numerous advantages over the conventional electrodes. The metal particles constituting the active material are held together by the binder. The particles therefore do not loose their cohesion not even by the oxidation of the electrode material, thereby increasing the mechanical stability of the electrode. The binder may advantageously be an acrylonitrile-butadiene styrene copolymerizate. The nitril groups contained in this copolymerizate are saponified during the operation of the electrode by the electrolytic liquid, such as 6 n KOH, to form carboxyl groups. In this manner, hydrophilic groups are produced, whereby the wetting of the electrode is facilitated. However, the saponification can also take place before the electrode is put in operation. In addition, the binder can be interlinked whereby the stability of the electrode is further increased. However, other materials such as rubber latex can also be used as the binder.

The structure of the electrodes themselves is preserved by the porous armor coating. The armor coating can be a kind of cage of expanded metal or another metal fabric for instance, materials such as iron and nickel can be used for this purpose.

The carbon added to the active material serves to assure good contact. In addition, it reduces the electric resistance of the electrode during the discharge as well as during the charging process. The carbon can be contained in the active material as carbon black, particularly acetylene carbon black. One can thereby achieve good contact without substantially increasing the weight of the electrode.

Another difficulty which exists in conventional electrodes is eliminated by the present invention, i.e., the difficulty that due to the inhibited access of the electrolyte to the active material, the latter is converted only to a small degree. This is achieved because of the areas with coarse pores, a sufficient number of pores is provided which are not clogged by the swelling that occurs during the discharge. In this manner continuous access of the electrolytic liquid to the active material is made possible, i.e., a continuous flow of ions into the interior of the electrode is assured.

In general a large volume of pores, which serve to achieve high ion conductivity, leads to reduced electron conductivity and to a lower mechanical strength of the electrodes. However, the electrode according to the present invention contains a framework of essentially parallel fibers of electrically conductive material. The term fibers is understood to mean fiber-like materials, such as fibers, filaments, wires, chips etc. The fibers may consist of metal such as nickel or silver, but metallized materials can also be used. Moreover, electrically conductive fibers of other materials such as graphite can be used. The material of the framework may advantageously also be steel wool. Through the presence of the fibers, coarse pores are produced in the electrode. In order to obtain electrolyte paths as short as possible, the fibers are arranged essentially perpendicularly to the electrode surface.

The active material with the additives is contained in the framework of electrically conductive fibers. Essential to the invention is that the electrode material, which is understood to be the active material including the added admixtures, is not distributed uniformly in the entire framework. The framework has rather alternating areas with coarse and fine pores, which extend perpendicularly to the contact layer to which the framework is applied. The areas with the coarse pores consist essentially of the fiber framework, and the areas with the fine pores consist essentially of the fiber framework with embedded electrode material. This means that the coverage density of the electrode material in a plane parallel to the electrode surface, i.e., parallel to the contact layer, varies periodically. The width of the individual areas is advantageously about 0.5 to 2mm. Because of the essential characteristic of the areas of different porosity it is assured that in any event the ion current gets to the interior of the electrode. Should the pores of the fine-pored areas adjacent to the electrolytic liquid get clogged up, pores in the coarse-pored areas, which are free of electrode material, always still remain open for the passage of electrolyte. Swelling during the discharge of the electrode can therefore not lead to an inhibition of the discharge or to its premature termination because of clogging of the pores. The free pores can moreover serve for the passage of hydrogen which may develop in the electrode particularly during the charging process.

According to the invention, in the process of charging a rechargeable electrode which contains iron powder as the active material, the iron oxides and/or hydroxides formed during the discharge are reduced and electrons pass via the contact layer to the framework of electrically conductive material. Metallic electron conductors in the form of metal fabric and expanded metal can be used as the contact layer. The contact layer may advantageously be a sheet, a grid or a screen of electrically conductive material. Metals with high hydrogen overvoltage and good corrosion resistance, such as silver are preferred for the contact layer. However, materials such as nickel and iron can also be used. From the contact layer, the electrons pass during the charging of the electrode to the framework which also serves as the carrier for the electrode material and are then distributed in the electrode material.

The electrode according to the present invention is also distinguished from conventional electrodes by improved chemical efficiency of the active material. It has larger capacity and a higher power-to-weight ratio as well as higher current and energy density. Due to these advantageous properties, it is particularly well suited for installation in metal-air cells which can find application in electric vehicles. The particular design of the electrode according to the invention makes possible particularly high chemical efficiency of the active material when discharged at high current densities. Using iron as the active material, 50 percent of the active material can be chemically converted at a current density of 40 $MA/cm^2$.

The active material can contain, in addition to the other additives, sulfur or a sulfur-containing substance. Rapid activation of the active material can be achieved thereby. The addition can be made in the form of powdered sulfur or as colloidal sulfur, as a sulfur-containing compound such as iron sulfide or tin sulfide, or as a salt, such as potassium or sodium sulfide or -hydrogen sulfide. However, the sulfur or the sulfur-containing additive can advantageously also be admixed to the electrolytic liquid which is used in the operation of the electrode. Electrolytic liquids are preferably alkaline solutions such as KOH, and NaOH, to which LiOH may be admixed.

The electrode according to the invention is advantageously prepared by first placing on at least one side of a contact layer a framework which is partially filled with active material including additives and consists of essentially parallel fibers arranged essentially perpendicularly to the contact layer, in such a manner that alternating areas are formed which consist essentially of fiber framework or of fiber framework filled with electrode material. Subsequently the framework or frameworks are encapsulated with a porous armor coating and the latter is connected with the contact layer.

In the preparation of the electrode it may be advantageous to provide a layer of the electrode material on one or both surfaces with a fiber framework and to compress it to form a plate in such a manner that part of the electrode material penetrates into the framework and fills the latter, but only partially. The plate is then cut into strips transversely to the longitudinal direction of the fibers, and the strips are arranged side by side on the contact layer in such a manner that the fibers are aligned perpendicularly to the contact layer. However, the layer of electrode material can also advantageously be placed partially in a fiber framework, with the electrode material filling the fiber framework only in part, and then made in a mold into a molding which is alternatingly notched across the longitudinal direction of the fibers. The molding can subsequently be folded at the notches and attached to the contact layer.

The electrode material can advantageously be prepared by first precipitating a binder onto the active material from a latex emulsion by acidifying in the aqueous phase. Subsequently one adds carbon while stirring vigorously, which settles on the particles of the active material. This method of preparation assures that the active material is covered with the carbon without danger that the components, i.e., the active material and the carbon, which are of different specific gravity, segregate during the subsequent filtration of the material mixture.

The invention will be explained in further detail with the aid of several figures and examples of embodiments.

DESCRIPTION OF THE PREFERRED EMBODIMENT

A metal electrode according to the invention may be manufactured as follows: 7 g of iron powder are suspended by means of a high-speed stirrer in about 150 ml of water. About 0.75 g of an aqueous latex emulsion with a content of about 43 percent of acrylonitrile butadiene styrene copolymerizate is added to this suspension and stirred vigorously; then, the binder is precipitated by adding a few drops of dilute acetic acid. Subsequently, while stirring vigorously, an acetylene carbon black which is commercially available under the trade name Acetogen Black is added. The carbon black then settles around the iron particles coated with the binder. If the sulfur is added to the electrode (and not to the electrolyte), after adding the carbon black the aqueous phase is reacted with about 0.05 to 0.1 g of sulfur or a sulfur-containing substance which has about the same sulfur content. The material mixture obtained in this manner is filtered, whereby the electrode material is obtained.

The described method has the advantage that in the preparation of the electrode material no segregation takes place by the filtration of the components which have very different specific gravities. If one would add to the suspension of the active material the carbon black first and the binder next, the binder would be absorbed almost completely by the carbon black. Thus, the active material would not be bound by the binder and it would hardly be possible to process the material mixture further without segregation.

The material mixture prepared according to the method described is, for instance, filtered on a square surface of 50 cm$^2$. The cake obtained, i.e., the layer of electrode material, is then provided on both sides with a thin layer of steel wool (dimensions: about 7 cm × 7 cm), the fibers of which extend essentially in one direction, and is compressed in a suitable manner to form a plate with a thickness of about 1 mm. The electrode material does not fill the framework of steel wool completely but is arranged between the two layers in such a manner that the two square surface areas of the plate are essentially free of the electrode material. The plate is then cut, transversely to the longitudinal direction of the fibers in strips 4 mm wide (length: about 7 cm), which are subsequently arranged parallel side by side with their narrow side (about 1 mm) on a contact screen. In this manner, the fibers of the framework then stand perpendicular to the contact screen. The contact screen consists, for instance, of iron; it has a mesh width of about 0.5 mm and wire of about 0.5 mm thickness. If the electrode to be produced is also to have a base area of about 50 cm$^2$, the strips obtained from four plates are arranged on the contact screen in the described manner. The strips may be attached to the contact screen in a suitable manner. The strips are finally covered with a porous armor coating which is connected with the contact screen.

Figure 1:
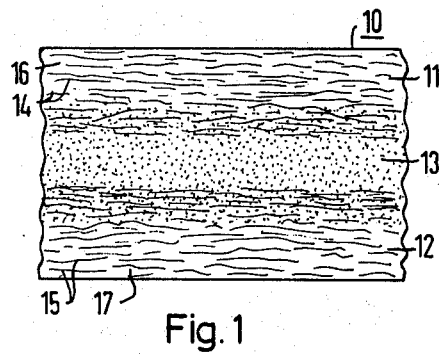
FIG. 1, shows a plate consisting of a framework of fibers and electrode material for the manufacture of an electrode according to the invention.

FIG. 1 shows a cross section through a plate 10 which was prepared by compressing a layer 13 of electrode material, i.e., active material plus additives, which was provided on both sides with a thin layer of steel wool 11 and 12, respectively. The fibers 14 and 15 of the steel wool framework extend in the longitudinal direction of the plate 10. The electrode material 13 has penetrated during the pressing process only partially into adjoining areas of the two steel wool frameworks, so that there are areas 16 and 17 which are free of electrode material. The remaining areas of the frameworks are filled with electrode material, and beyond this there is an area between the two fiber frameworks which has exclusively electrode material.

Figure 2A:
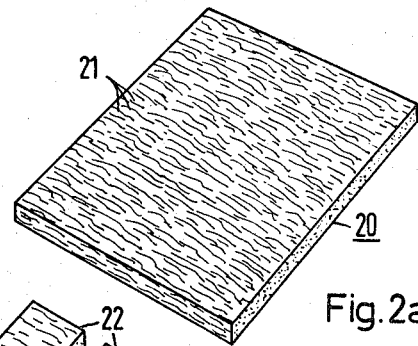
FIGS. 2a to 2c, show products of different steps of the method in a preferred method for manufacturing the electrode according to the invention.
Figure 2C:
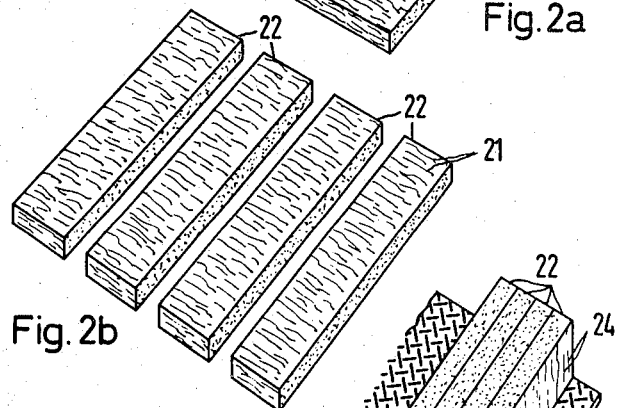
Figure 2B:
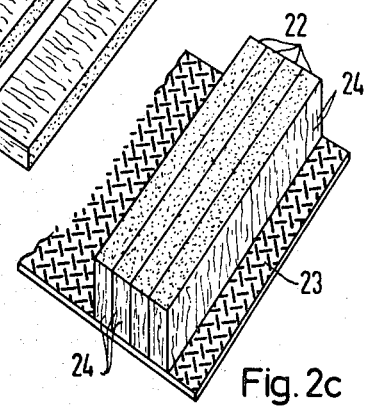

In FIG. 2a such a plate 20, made from two layers of steel wool and one layer of electrode material, is shown. For the sake of clarity, however, only the fibers 21 are shown but not the individual areas of the plate. The plate 20 is cut, for making an electrode, transversely to the longitudinal direction of the fibers 21 into strips 22, which are shown in FIG. 2b. The strips 22 are subsequently arranged, as is shown in FIG. 2c, parallel side by side with their narrow sides on a contact layer 23, for instance, a contact screen. The fibers 24, which are essentially parallel to each other, are aligned in this manner perpendicularly to the contact layer 23. In the described arrangement of the strips, those areas of the individual strips always adjoin each other which are free of electrode material. In this manner, alternating areas with different coverage density of electrode material are produced in the fiber framework arranged on the contact layer.

The manufacture of the strips can also be carried out in one operation. To do so, the compressing of the two layers of steel wool and the layer of electrode material, and the cutting of the plate into strips are carried out simultaneously in a suitable device.

Figure 3B:
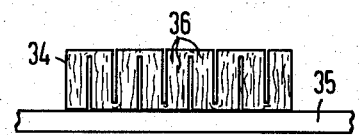
FIGS. 3a and 3b, show intermediate products of a further preferred method for the manufacture of an electrode according to the invention.
Figure 3A:
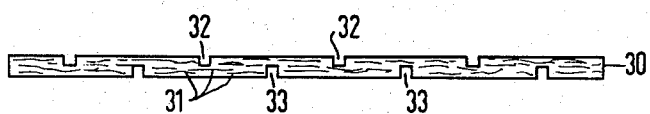

For preparing an electrode, one can also proceed in the following manner. A layer of electrode material is first placed in a fiber framework in such a way that only part of the electrode material penetrates into the fiber framework and the latter itself is only partially filled with electrode material. From such a plate a molding is made in a suitable device; the molding has alternating notches across the or perpendicular to the lengthwise direction of the fibers. The notches on the one surface are symmetrically staggered against the notches on the opposite surface. FIG. 3a shows a cross section through such a molding 30. For the sake of clarity, only the fibers 31 are indicated in the molding 30; the electrode material, which fills the molding partially, is not shown. In the longitudinal direction of the fibers 31 the molding is alternatingly provided with notches 32 and 33, respectively. Such a molding is folded at the notches and placed on a contact layer, for instance, a screen, grid or sheet. In FIG. 3b the folded molding is designated with 34 and the contact layer with 35. Through the folding and the corresponding arrangement of the molding on the contact layer is achieved that the fibers 36 are aligned essentially perpendicularly to the contact layer and alternating areas with different coverage density of electrode material exist in the fiber framework. Also with this method of manufacture the electrode material can be provided with a fiber framework on both surfaces.

If moldings of the kind shown in FIG. 3a are made which have notches at spacings of about 9 mm with a width of 1 mm, with the dimensions of the molding being about 7 cm × 7 cm, and if one arranges on both sides of a contact layer eight folded moldings in the described manner, one obtains, after armor coatings have been applied, an electrode with a surface of $2 \times 50$ cm$^2$. With a current of 4 A, i.e., a current density of 40 mA/cm$^2$, about 50 percent of the active material, i.e., of the iron powder, can be converted by such an electrode.

Figure 4:
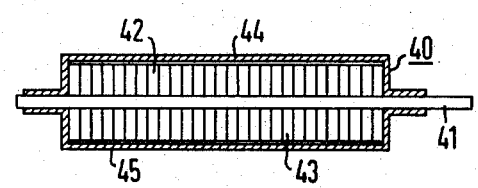
FIG. 4, shows a cross section through a preferred embodiment of an electrode according to the invention.

FIG. 4 shows a cross section through an electrode 40 according to the invention, in which fiber frameworks 42 and 43, respectively, are arranged on both sides of a contact layer 41. The fiber frameworks 42 and 43 contain the electrode material in areas of alternating coverage density (not shown in the figure for the sake of clarity). The fiber frameworks 42 and 43 are covered by respective armor coatings 44 and 45 in the form of a basket-shaped expanded metal, for instance, of nickel; the mesh width is 3 to 4 mm, the thickness about 0.5 to 1 mm. The armor coatings are connected at various points with the contact layer 41, for instance, by spot welding, whereby the structure is held together. It may in addition be advantageous to connect the two baskets with each other.

Figure 5:
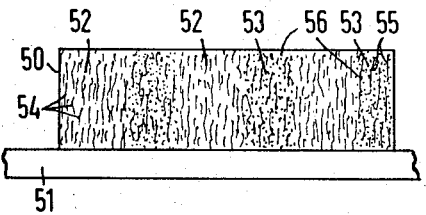
FIG. 5, shows a section of an electrode according to the invention.

FIG. 5 shows a section of an electrode according to the invention, in which the areas of different coverage density are shown. The fiber framework which is arranged on one side of a contact layer 51 is designated with 50. The fiber framework 50 has alternatingly areas 52 with coarse pores and areas 53 with fine pores. The coarse-pored areas 52 contain here essentially only fiber material 54, while the fine-pored areas 53 contain fiber material 55 as well as electrode material 56. The fiber material is aligned in all areas essentially perpendicularly to the contact layer.

What is claimed is:

1. A rechargeable metal electrode for storage batteries or metal-air cells which comprises active electrode material combined with a binder and carbon, a contact layer, a framework of substantially parallel fibers of electrically conductive material arranged substantially perpendicular to said contact layer as a carrier for said active electrode material and a porous armor coating covering said framework wherein said framework contains said active electrode material and has alternating areas of coarse and fine pores extending perpendicularly to said contact layer, said coarse-pored areas consisting essentially of fiber framework and said fine-pored areas consisting essentially of said active electrode material embedded in said fiber framework.

2. The electrode of claim 1 wherein said active electrode material is metal powder.

3. The electrode of claim 1 wherein said active electrode material is iron powder.

4. The electrode of claim 1 wherein said binder is an acrylonitrile-butadiene styrene copolymerizate.

5. The electrode of claim 1 wherein said carbon is carbon black.

6. The electrode of claim 5 wherein said carbon black is acetylene carbon black.

7. The electrode of claim 1 wherein said active electrode material further includes sulfur.

8. The electrode of claim 1 wherein said active electrode material further includes a sulfur containing substance.

9. The electrode of claim 1 wherein said framework consists of steel wool.

10. The electrode of claim 1 wherein said contact layer consists of a screen of electrically conductive material.

11. The electrode of claim 1 wherein said contact layer consists of a sheet of electrically conductive material.

12. The electrode of claim 1 wherein said contact layer consists of a grid of electrically conductive material.

13. The method of manufacturing a rechargeable metal electrode for storage batteries or metal-air cells which comprises: placing on at least one side of a contact layer a framework consisting of substantially parallel fibers and partially filled with an active electrode material, such that said fibers are substantially perpendicular to said contact layer and such that a plurality of alternating areas, one consisting essentially of fiber framework and the other consisting essentially of fiber framework and active electrode material are formed; covering said framework with a porous armor coating; and connecting said coating to said contact layer.

14. The method of claim 13 wherein said fiber framework partially filled with said active electrode material is first formed by placing on at least one surface of said active electrode material said fiber framework; compressing said fiber framework and said active electrode material to form a plate such that part of said active electrode material penetrates into the framework and partially fills the framework; cutting the plate into strips transversely to the longitudinal direction of said fibers; and arranging the strips side by side on said contact layer with said fibers aligned substantially perpendicular to said contact layer.

15. The method of claim 13 wherein said fiber framework partially filled with active electrode material is first formed by partially filling said framework with said active electrode material; molding said framework partially filled with said active electrode material in a mold; cutting notches in said molded material across the longitudinal direction of said fibers; folding said molding material at said notches; and attaching said folded molded material to said contact layer.

* * * * *